(12) United States Patent
Liu et al.

(10) Patent No.: US 10,528,538 B2
(45) Date of Patent: Jan. 7, 2020

(54) LEVERAGING SQL WITH USER DEFINED AGGREGATION TO EFFICIENTLY MERGE INVERTED INDEXES STORED AS TABLES

(71) Applicant: Oracle International Corporation, Redwood Shores, CA (US)

(72) Inventors: Zhen Hua Liu, San Mateo, CA (US); Aleksandra Czarlinska, San Jose, CA (US); Douglas James McMahon, Redwood City, CA (US); Asha Makur, Newark, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 446 days.

(21) Appl. No.: 15/281,746

(22) Filed: Sep. 30, 2016

(65) Prior Publication Data
US 2018/0096007 A1   Apr. 5, 2018

(51) Int. Cl.
*G06F 16/22* (2019.01)
*G06F 16/23* (2019.01)
*G06F 16/31* (2019.01)
*G06F 16/2455* (2019.01)

(52) U.S. Cl.
CPC .............. *G06F 16/22* (2019.01); *G06F 16/23* (2019.01); *G06F 16/24556* (2019.01); *G06F 16/319* (2019.01)

(58) Field of Classification Search
CPC ......... G06F 17/30463; G06F 17/30466; G06F 17/30498; G06F 17/30445; G06F 17/30489; G06F 17/30312; G06F 17/30345; G06F 17/30622; G06F 16/22; G06F 16/23; G06F 16/24556; G06F 16/319
USPC ................. 707/E17.005, 713, 714, 737, 609
See application file for complete search history.

(56) References Cited

U.S. PATENT DOCUMENTS

| | | | |
|---|---|---|---|
| 7,996,387 B2 | 8/2011 | Das et al. | |
| 8,301,620 B2 | 10/2012 | Sthanikam et al. | |
| 8,650,204 B2 | 2/2014 | Liu et al. | |
| 9,239,763 B2 | 1/2016 | Lee et al. | |
| 9,390,115 B2 | 7/2016 | Liu et al. | |
| 2003/0078909 A1* | 4/2003 | Pham | G06F 17/30454 |
| 2010/0005077 A1* | 1/2010 | Krishnamurthy | G06F 17/30463 707/E17.136 |
| 2012/0173515 A1* | 7/2012 | Jeong | G06F 17/30569 707/718 |
| 2013/0173588 A1* | 7/2013 | Ma | G06F 16/00 707/714 |
| 2014/0222872 A1* | 8/2014 | Rambo | G06F 17/30345 707/803 |

* cited by examiner

*Primary Examiner* — Robert W Beausoliel, Jr.
*Assistant Examiner* — Pedro J Santos
(74) *Attorney, Agent, or Firm* — Hickman Palermo Becker Bingham LLP (57) ABSTRACT

Techniques are described herein for using user-defined aggregate functions for updating inverted index tables. A user-defined aggregate function is registered in a database system for updating an index table based on changes stored in a staging table. A query specifying the user-defined aggregate function may be executed in parallel to parallelize the updating of the index table.

22 Claims, 5 Drawing Sheets

STAGING TABLE 300

| KEYWORD | START_DOCID | END_DOCID | POSTING_LIST |
|---|---|---|---|
| K4 | D6 | D7 | (D6, 100), (D7, 140) |
| K2 | D6 | D6 | (D6, 120) |
| K3 | D7 | D7 | (D7, 130) |
| K4 | D8 | D9 | (D8, 120), (D9,. 400) |
| K1 | D9 | D9 | (D9, 120) |
| K1 | D1 | D1 | (D1, 130) |
| K2 | D1 | D3 | (D1, 135), (D3, 270) |

302: rows 1–3
304: rows 4–5
306: row 6
308: row 7

FIG. 1

INDEX TABLE 200

| KEYWORD | START_DOCID | END_DOCID | POSTING_LIST |
|---|---|---|---|
| K1 | D1 | D4 | (D1, 100), (D3, 240), (D4, 320) |
| K2 | D1 | D2 | (D1, 150), (D2, 100) |
| K3 | D3 | D5 | (D3, 250), (D4, 315), (D5, 190) |
| K4 | D2 | D2 | (D2, 130), (D2, 440) |

FIG. 2

STAGING TABLE 300

| KEYWORD | START_DOCID | END_DOCID | POSTING_LIST |
|---|---|---|---|
| K4 | D6 | D7 | (D6, 100), (D7, 140) |
| K2 | D6 | D6 | (D6, 120) |
| K3 | D7 | D7 | (D7, 130) |
| K4 | D8 | D9 | (D8, 120), (D9, 400) |
| K1 | D9 | D9 | (D9, 120) |
| K1 | D1 | D1 | (D1, 130) |
| K2 | D1 | D3 | (D1, 135), (D3, 270) |

302 { (rows 1–3)
304 { (row 4)
306 { (row 5)
308 { (rows 6–7)

LEVERAGING SQL WITH USER DEFINED AGGREGATION TO EFFICIENTLY MERGE INVERTED INDEXES STORED AS TABLES

FIELD OF THE INVENTION

The present invention relates to database index management, and more specifically, to managing inverted index tables in a relational database.

BACKGROUND

A database index is a data structure that is associated with a table, a group of tables, or database files. The database index allows faster retrieval of database objects. For example, an index on a column of a table allows for retrieval of rows from the table without having to scan each row and compare the values in the column.

One type of database index is an inverted index. An inverted index maps content to their locations in a database file or document. For example, an inverted index may map a keyword to a set of one or more documents that contain the keyword.

To increase query efficiency, location values may be packed into as few rows as possible. That is, a single row may store a plurality of location values for a keyword, rather than storing each location value in a separate row. For example, if a plurality of documents each contain a particular keyword, a row in the inverted index table may store a list indicating the document IDs for the plurality of documents.

When a database object or file is changed, added, or removed by a database transaction, the inverted index needs to be updated to reflect the changes. For example, if a document is added that contains a keyword, then the corresponding row in the inverted index table is updated to include the document ID. However, as location values for a keyword are packed into the same row(s), the row for the keyword is locked while it is updated. If a second transaction affects the same keyword, the second transaction must wait for the lock to be released before it can update the row. This slows down the processing of database transactions.

A separate row may be created in the index table for each keyword that is updated by a database transaction. Since each database transaction has its own rows, a database transaction does not have to wait for any other database transactions to complete before writing to its rows. However, as the number of database transactions increase, the number of different rows for a keyword increases. The index table becomes fragmented, and using the index table for queries becomes less efficient.

A staging table may be used to store rows from database transactions. The staging table collects the fragmented rows and is periodically merged into the main index table. Rows are updated or added to the index table based on each row of the staging table. However, because rows in the index table cannot be modified at the same time, merging the index table with the staging table is processed serially. If the work for merging the staging table is divided between multiple slave processes and performed in parallel, there is a risk that two slave processes will attempt to modify the same row at the same time.

One solution is to write a custom program that can manipulate kernel threads in order to avoid contention. However, this is a low-level solution that is not flexible across different database systems. Therefore, there is a desire for an efficient method for merging index tables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for using user-defined aggregate functions to merge a staging table with an index table. A user-defined aggregate function is a custom function registered with a database system. The function may be specified in a query like other query operations. A query may also specify a grouping operation that groups rows of a staging table by keyword.

The techniques described herein exploit aggregate operations in order to make changes to the database, rather than aggregating data. The staging table is grouped into subsets and the database system's framework for executing aggregate operations in parallel is utilized to process the subsets in parallel.

According to one embodiment, when a database system receives a query, it generates an execution plan for the query. The database system divides the work for the query into work granules, which can be assigned to respective processes and processed in parallel with one another.

A work granule may comprise work for a keyword group. In other words, a respective process is assigned a keyword group, and rows within the keyword group are merged with the index table by the same process.

System Overview

Figure 1:
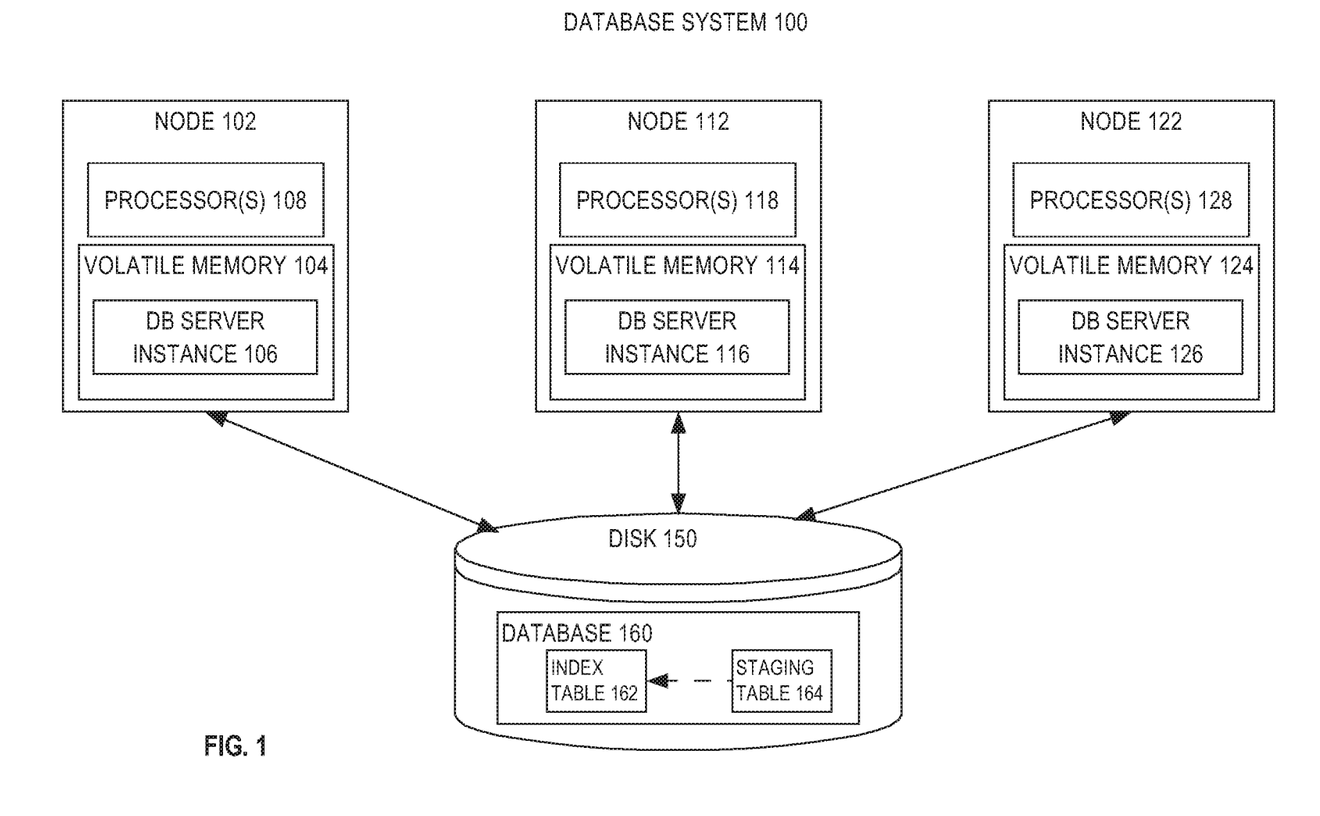
FIG. 1 is a block diagram illustrating a multi-node database system.

FIG. 1 depicts a database system on which an embodiment may be implemented. In the embodiment illustrated in FIG. 1, system 100 comprises three nodes, 102, 112, and 122. Although three nodes are shown in the present illustration, in other embodiments, system 100 may comprise fewer or more nodes.

Nodes 102, 112, and 122 respectively have one or more processors 108, 118, and 128 and local random access memory 104, 114, and 124. In addition, nodes 102, 112, and 122 are respectively executing database server instance 106, 116, and 126. While in the illustrated embodiment each node is executing a single database server instance, in alternate embodiments, a single node may execute more than one database server instance.

Each of nodes 102, 112, and 122 have access to the same database 160. For the purpose of illustration, database 160 is shown as stored on a single shared disk 150, but in alternative embodiments, may be spread across multiple disks to which each of nodes 102, 112, and 122 have access. Database 160 includes one or more index tables 162 and one or more staging tables 164.

Index Table

An inverted index table maps keywords to one or more locations that contain the keyword. The index table may index a column of one or more database tables or partitions. The index table may also index domain-specific properties of a complex data type. For example, text data may be written in a certain language and contain keywords which users may use to form basis of searches or lookups. Image data may have properties such as height, width, and other metadata. The database system can create and store indexes that index domain-specific properties.

Figure 2:
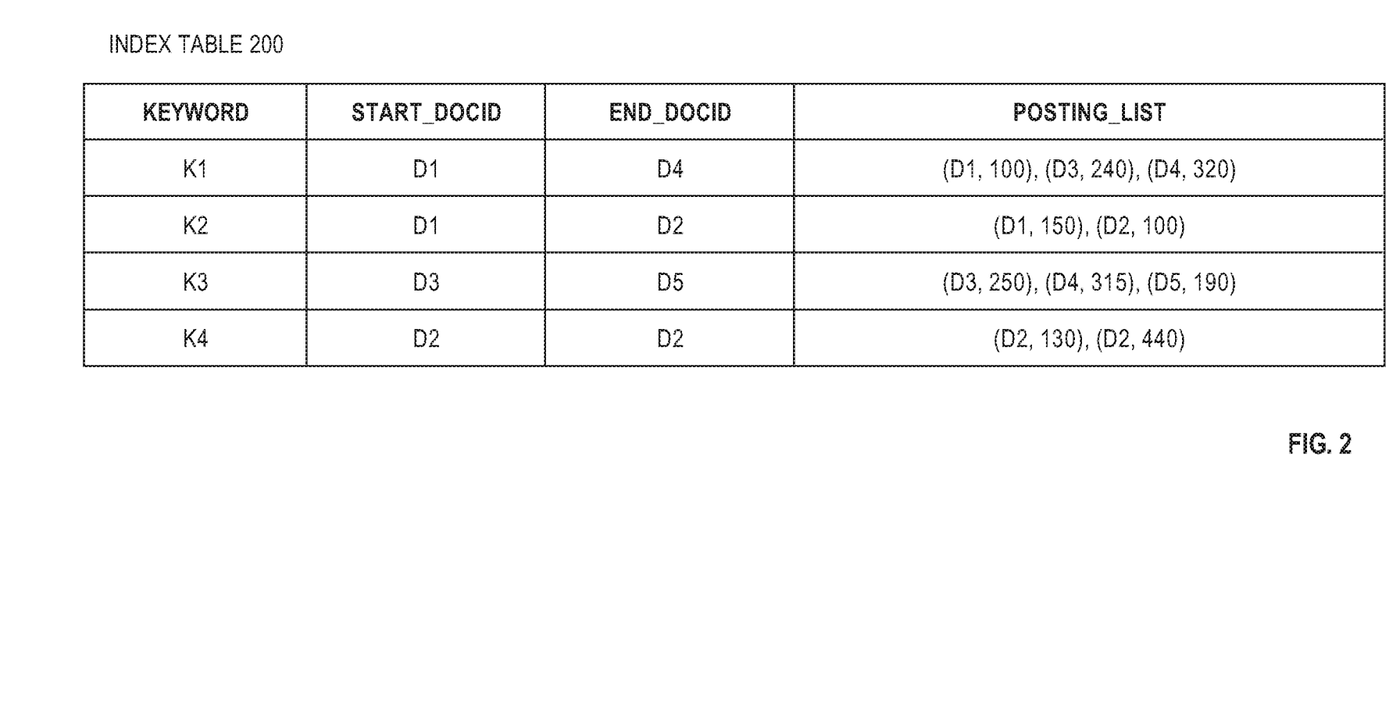
FIG. 2 is a block diagram illustrating an index table.

FIG. 2 illustrates an example inverted index table that maps keywords to documents. Index table 200 indexes four keywords, K1, K2, K3, and K4, and includes four columns:

the "keyword" column indicates an indexed keyword;

the "start_docID" column indicates the smallest document ID of a set of documents that contain the keyword;

the "end_docID" column indicates the greatest document ID of the set of documents that contain the keyword;

the "posting_list" column stores a posting list for the keyword.

As referred to herein, a posting list is a data structure that lists a set of location values. For example, a posting list may store a list of document IDs, file names, or disk locations. In an embodiment, the posting list is stored as an object data type such as a Binary Large Object (BLOB). In other embodiments, the posting list may be stored as other data types such as a string. If the posting list is larger than the size of the particular data type, a new row may be added for the keyword. Additions to a posting list are added to the next available row for the keyword.

In the present example, the "posting_list" column stores the posting list as a list of ordered pairs, ("document_ID", "offset"). "Document_ID" refers to the document ID of a document that contains the keyword. "Offset" indicates the location or position at which the keyword appears within the document.

Staging Table

One or more staging tables may be used to store updated data for an index table. When a database transaction updates a posting list for a keyword, the keyword and posting list are stored in a row in a staging table. In an embodiment, a staging table is only associated with one index table, but an index table may have more than one staging tables.

If the database system receives a query, both the index table and one or more staging tables associated with the index table are queried for the keyword. The database system retrieves all rows from the staging table that have a posting list for a desired keyword.

Rows in the staging table are periodically merged into the associated index table. The posting list for a keyword in the index table is updated to reflect additions from the staging table. In an embodiment, the index table is also updated to delete any postings that were removed. Once the index table has been updated, the corresponding row in the staging table may be deleted.

In an embodiment, an index table has at least two associated staging tables. A first staging table may be used to store posting lists from transactions. When the first staging table is merged with the index table, a second staging table is swapped in to store posting lists.

Figure 3:
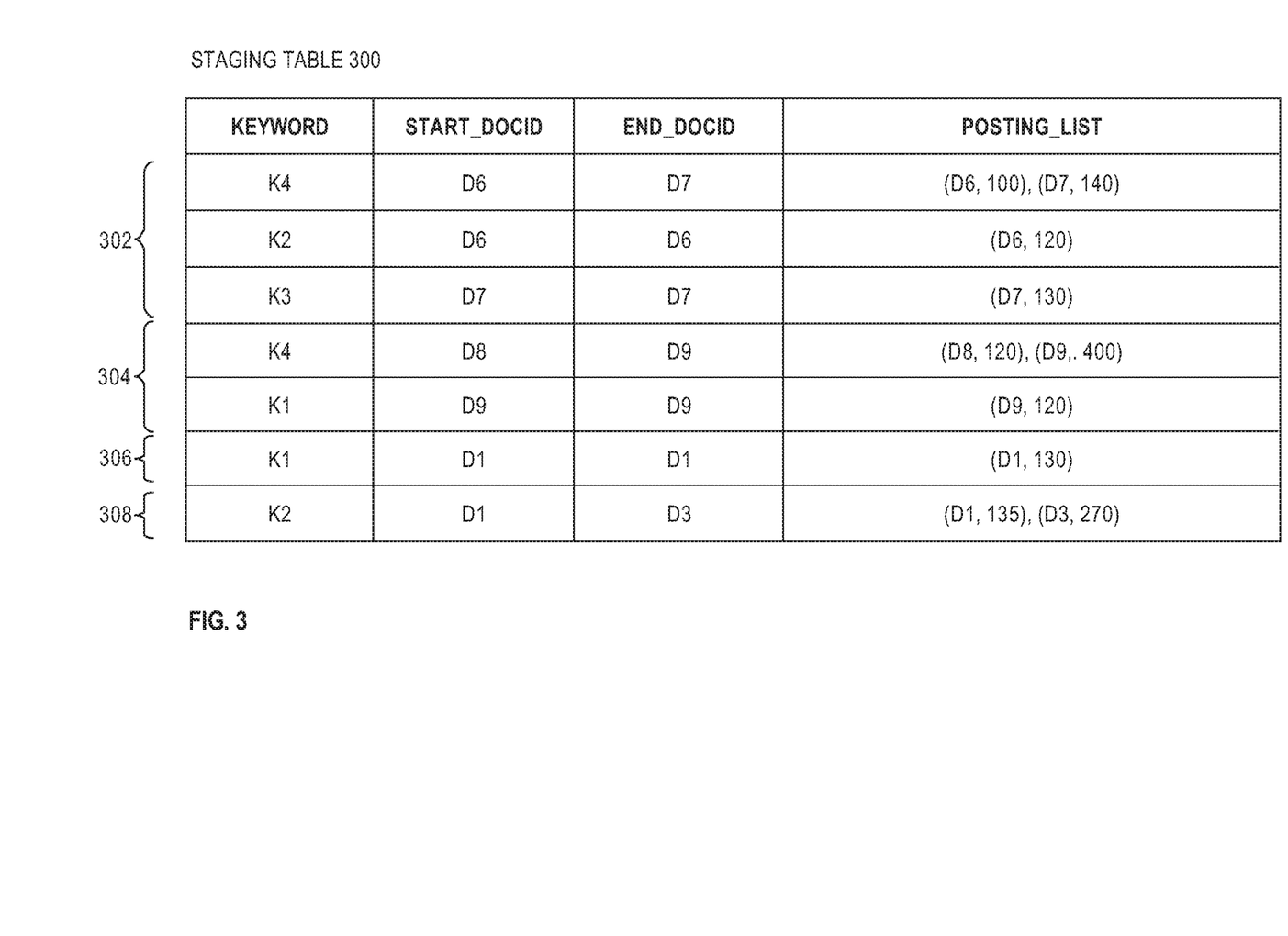
FIG. 3 is a block diagram illustrating a staging table.

FIG. 3 illustrates an example staging table. Staging table 300 is a staging table for index table 200. Like index table 200, staging table 300 includes four columns, "keyword," "start_docID," "end_docID," and "posting_list." Staging table 300 records changes made by four transactions, transaction 302, 304, 306, and 308. Each transaction records changes for a keyword to a separate row. Separate transactions that change the same keyword are also stored in separate rows. For example, transaction 302 corresponds to three rows, one for keyword K4, one for keyword K2, and a third for keyword K3. Additionally, while both transaction 304 and transaction 306 modified the posting list for keyword K1, the two transactions correspond to posting lists that are stored in their respective rows.

User Defined Aggregate Function

A user defined aggregate function is used to merge rows of a staging table with an index table. User-defined aggregate functions are SQL functions that may be defined by a user and are not native functions defined by a SQL standard. The object relational SQL compilers of database systems are configured to compile and execute user-defined functions when the functions appear in statements being compiled by the object relational SQL compiler. In order to recognize and otherwise handle a user-defined function, the functions are registered with the database system.

A user may be a developer of a DBMS software product. The DBMS software may include user-defined functions "out-of-box".

Registering a user-defined function refers to a database system receiving as input the definition of a user-defined function and configuring itself (e.g. generating database metadata in a database dictionary) to handle the user-defined functions when they appear in database statements compiled by the database system. The definition includes the name of the function, arguments and return type of the function, and implementation (e.g. code) to execute and compute the function. The implementation may have to conform to a format, which may depend on the kind of user-defined function being registered. For example, the implementation for an aggregate user-defined function must include an implementation function for initialization, iteration, and termination, as described in further detail below.

For the purpose of illustration, assume index_agg( ) is a user defined aggregate function for merging rows of a staging table with an index table. Because index_agg( ) is an aggregate type of function, the implementation includes an initialization function, an iterate function, and a terminate function.

A function call to index_arg( ) may include a group of rows or a group of posting lists to merge with an index table. The initialize function is called to perform initialization activity, such as sorting a group of posting lists by document IDs.

The iterate function is called for each row within a group of rows or each posting list in a group of posting lists. In an embodiment, the iterate function reads the posting list for a row and merges it with the corresponding row within the index table. The posting list for each row is merged with the posting list of the row in the index table that contains the particular keyword. In an embodiment, the iterate function searches for the row in the index table that indexes the particular keyword, and appends data to the posting list. For example, the iterate function may execute the command, "UPDATE index_table set posting_list=:newpostinglist WHERE keyword=:k." If the row cannot hold more data, the iterate function may create a new row for the particular keyword. For example, the iterate function may execute the command, "INSERT index_table VALUES(:k, :start_docID, :end_docID, :newpostinglist)

In one embodiment, the staging table indicates changes to be made to the index table. For example, the posting list column may indicate that a particular document and offset should be added to the index table posting list, or that a particular document and offset should be removed from the index table posting list. The iterate function may update the row in the index table by adding or removing the specified document ID and offset.

The terminate function commits the changes made to the index table and the staging table for the particular keyword. In an embodiment, the terminate function does not return any results. In other embodiments, the terminate function indicates what items were merged or whether there were any errors.

Once the index table is updated, the rows from the staging table are deleted. In an embodiment, the iterate function deletes a row from the staging table after its posting list is appended to a posting list in the index table. In another embodiment, the terminate function deletes all rows in the group of rows. For example, the terminate function may truncate the table.

In an embodiment, a staging table includes metadata that indicates which index table it is a staging table for. In another embodiment, the aggregate function specifies a particular index table. For example, if the structure of an index table differs from the structure of a second index table, then each index table may require a different aggregate function to merge data into the index table.

Query Execution Using an Aggregate Function

Once a user defined aggregate function has been registered in the database system, the function may be used within a query and executed as part of executing the query.

In an embodiment, a query specifying the aggregate function is stored in the database and periodically executed by the database system. The database system may be configured to execute the query when certain conditions are met. For example, the query may be automatically executed when a staging table reaches a particular size.

To execute a query, a DBMS first generates a query execution plan. An execution plan generated by a DBMS defines operations to be performed to execute a query and an order for performing the operations, known as plan operations. A DBMS may execute the execution plan as a distributed operation. The execution plan divides plan operations into work granules, some of which may be executed in parallel by a plurality of processes.

In some embodiments, when a query is received by a database server instance, the work of the query may be parallelized by distributing the work to multiple processes according to the query execution plan. In a clustered database system, the query may be received by a single node, but then the work of the query may be distributed to multiple nodes in the cluster according to the query execution plan.

For example, assume database system 100 stores the following query for index table 200 and staging table 300:
SELECT keyword, INDEX_AGG(posting_list ORDER BY start_docID, end_docID)
FROM table_300
GROUP BY keyword The query includes aggregate function index_agg( ) with a parameter value of the posting_list column, sorted by "start_docID" and "end_docID." Additionally, the query includes a "group by" operation for grouping rows of staging table 300 by values in the keyword column. Rows with the same keyword are grouped together and index_agg( ) is called for each keyword group.

If the query is processed in parallel, the work each keyword group is assigned to a process in a plurality of processes. In an embodiment, a process may be assigned a plurality of keyword groups, but work for a keyword group is performed by the same process. This avoids having multiple processes attempt to make changes to the same row, but allows for different rows with different keywords to be updated at the same time.

Figure 4:
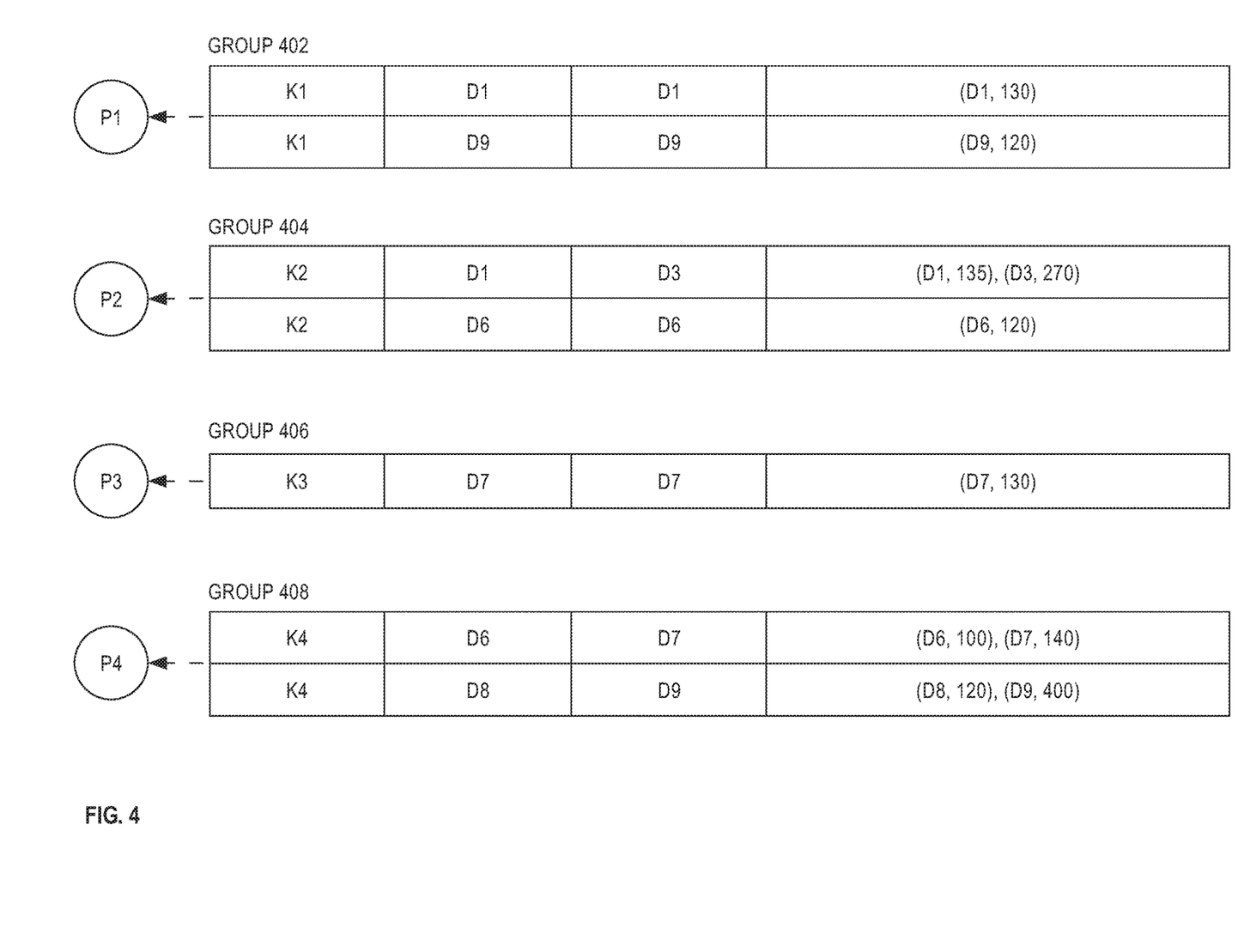
FIG. 4 is a block diagram illustrating keyword groups assigned to slave processes.

Referring to FIG. 4, it illustrates grouped rows of staging table 300 assigned to four parallel processes. Keyword group 402 for keyword K1 is assigned to process P1. Keyword group 404 for keyword K2 is assigned to process P2. Keyword group 406 for keyword K3 is assigned to process P3. Keyword group 408 for keyword K4 is assigned to process P4. In the illustrated example, each process is assigned a single group, but a process can be assigned more than one group. In the illustrated example, the grouped rows are sorted first by the "start_docID" column and then by the "end_docID" column. Each process executes index_agg( ) for the respective group of rows.

For example, process P1 is assigned the group of rows with keyword K1. Process P1 acquires a lock on the row for keyword K1, the first row in index table 200. The iterate function is called for each row in keyword group 402. The iterate function first aggregates the first row, with posting list (D1, 130). The updated posting list in index table 200 would include:
(D1, 100), (D1, 130), (D3, 240), (D4, 320)

The iterate function then aggregates the second row of group 402, with posting list (D9, 120). The updated posting list in index table 200 would include:
(D1, 100), (D1, 130), (D3, 240), (D4, 32), (D9, 120)

When the iterate function is completed and no rows remain, the terminate function commits the changes to index table 200 and releases the lock on the row for keyword K1. The two rows in staging table 300 are deleted.

Database Systems

Embodiments of the present invention are used in the context of DBMS's. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use another terminology.

A database dictionary comprises metadata that defines database objects physically or logically contained in a database. In effect, a database dictionary defines the totality of a database. Database objects include tables, indexes, views, columns, data types, users, user privileges, functions, and storage structures, such as table spaces, which are used for storing database object data.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Database commands may be submitted to a database instance in the form of database statements that conform to a database language supported by the database instance. For example, SQL data definition language ("DDL") instructions are issued to a database server to create or configure database objects, such as tables, views, or complex types. Although SQL is mentioned as one example, there are many other example database languages and exposed interfaces to the database, any of which may be used in conjunction with the techniques described herein. The database server may also receive and execute Procedural Language/Structured Query Language ("PL/SQL") commands, Java-based commands, remote procedure call commands, or commands that conform to other programming languages or constructs.

A database statement may be in the form of a database statement that conforms to a syntax of a database language. One example language for expressing database statements is the SQL. DDL statements are issued to a DBMS to define database structures such as tables, views, or complex data types. For instance, CREATE, ALTER, DROP, and RENAME, are examples of DDL commands found in some SQL implementations. When DDL statements are issued to create a database object or to modify database object, the database dictionary is modified to define the database objects accordingly.

A logical unit of work that is comprised of one or more database language statements is referred to as a transaction. When a database system executes a transaction, the transaction may read or update a data item that was written or updated in response to the execution of previous transactions.

In one embodiment, the operation is a data manipulation event that modifies or otherwise manipulates database data. For instance, the request may be a DML command, which are issued to a DBMS to manage data stored within a database structure. For instance, SELECT, INSERT, UPDATE, and DELETE are common examples of DML instructions found in some SQL implementations. SQL/WL and SQL/JSON are extensions of SQL used when manipulating XML data in an object-relational database. A DML command may add, modify, or delete a document that contains keywords that have been indexed in an index table.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
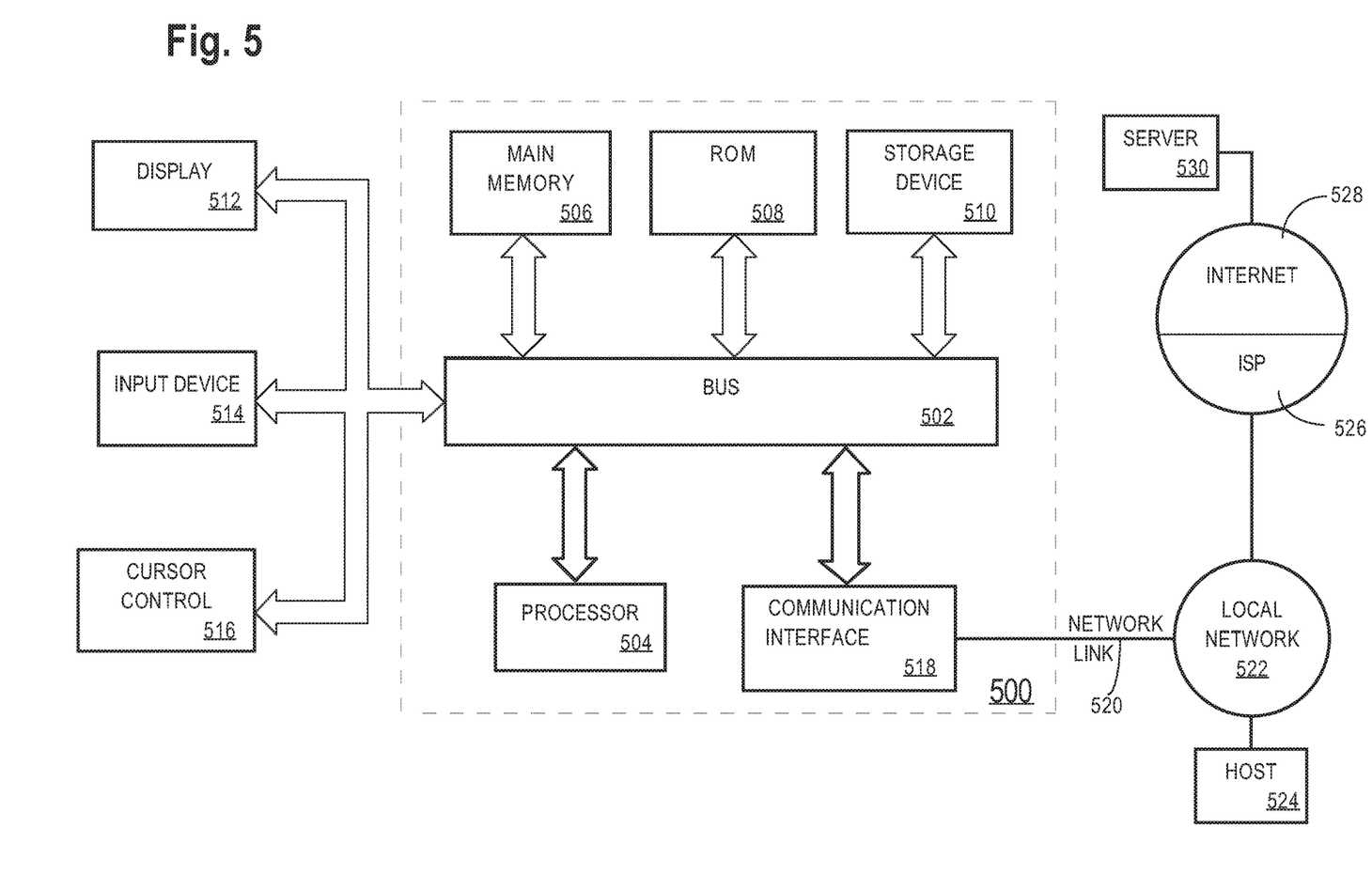
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    a DBMS storing an index table and a staging table that stores changes to be made to said index table;
    said DBMS executing an execution plan for executing a query for updating said index table, said query specifying:
        to group rows from said staging table into groups according to a grouping key, each group of said groups comprising respective one or more rows;
        to apply an aggregate operator that is defined by a database dictionary of said DBMS to said groups;
    wherein executing said execution plan comprises executing said aggregate operator, wherein executing said aggregator operator includes:
        for each group of said groups, updating one or more rows of said index table based on changes recorded in the respective one or more rows comprising said each group.

2. The method of claim 1, wherein said execution plan specifies multiple work granules, each work granule of said multiple work granules specifying to aggregate said groups of one or more rows; and
    wherein executing said execution plan includes multiple processes executing said multiple work granules in parallel.

3. The method of claim 2 wherein work granules for each group are executed by the same process.

4. The method of claim 1, wherein executing said aggregate operator further includes committing one or more updates to said index table.

5. The method of claim 1, wherein executing said aggregate operator further includes deleting rows from said staging table.

6. The method of claim 1, further comprising:
the DBMS storing a second staging table; and
in response to executing the query, storing changes to said index table in said second staging table.

7. The method of claim 1 wherein updating one or more rows of said index table comprises appending data to said one or more rows of said index table.

8. The method of claim 7 further comprising:
determining said one or more rows has insufficient space to append data; and
creating a new row in said index table to store said data.

9. The method of claim 1 wherein executing said aggregate operator comprises, for each group in said groups:
iterating through each row of a respective one or more rows;
determining one or more changes recorded in said each row; and
updating a row of said index table based on the one or more changes recorded in said each row.

10. The method of claim 1 wherein the DBMS periodically automatically executes said query.

11. The method of claim 1 wherein the index table is an inverted index and said grouping key corresponds to keywords mapped by the inverted index.

12. One or more non-transitory computer-readable media storing instructions, wherein the instructions include:
instructions which, when executed by one or more hardware processors, cause a DBMS storing an index table and a staging table that stores changes to be made to said index table;
instructions which, when executed by one or more hardware processors, cause said DBMS executing an execution plan for executing a query for updating said index table, said query specifying:
to group rows from said staging table into groups according to a grouping key, each group of said groups comprising respective one or more rows;
to apply an aggregate operator that is defined by a database dictionary of said DBMS to said groups;
wherein executing said execution plan comprises executing said aggregate operator, wherein executing said aggregator operator includes:
for each group of said groups, updating one or more rows of said index table based on changes recorded in the respective one or more rows comprising said each group.

13. The one or more non-transitory computer-readable media of claim 12, wherein said execution plan specifies multiple work granules, each work granule of said multiple work granules specifying to aggregate said groups of one or more rows; and
wherein executing said execution plan includes multiple processes executing said multiple work granules in parallel.

14. The one or more non-transitory computer-readable media of claim 13 wherein work granules for each group are executed by the same process.

15. The one or more non-transitory computer-readable media of claim 12, wherein executing said aggregate operator further includes committing one or more updates to said index table.

16. The one or more non-transitory computer-readable media of claim 12, wherein executing said aggregate operator further includes deleting rows from said staging table.

17. The one or more non-transitory computer-readable media of claim 12, the instructions further including:
instructions which, when executed by one or more hardware processors, cause the DBMS storing a second staging table; and
instructions which, when executed by one or more hardware processors, cause in response to executing the query, storing changes to said index table in said second staging table.

18. The one or more non-transitory computer-readable media of claim 12 wherein updating one or more rows of said index table comprises appending data to said one or more rows of said index table.

19. The one or more non-transitory computer-readable media of claim 18 further comprising:
instructions which, when executed by one or more hardware processors, cause determining said one or more rows has insufficient space to append data; and
instructions which, when executed by one or more hardware processors, cause creating a new row in said index table to store said data.

20. The one or more non-transitory computer-readable media of claim 12 wherein executing said aggregate operator comprises, for each group in said groups:
iterating through each row of a respective one or more rows;
determining one or more changes recorded in said each row; and
updating a row of said index table based on the one or more changes recorded in said each row.

21. The one or more non-transitory computer-readable media of claim 12 wherein the DBMS periodically automatically executes said query.

22. The one or more non-transitory computer-readable media of claim 12 wherein the index table is an inverted index and said grouping key corresponds to keywords mapped by the inverted index.

* * * * *